Feb. 11, 1964 K. THORMANN ETAL 3,120,993
GAS PURIFICATION PROCESS
Filed May 9, 1961
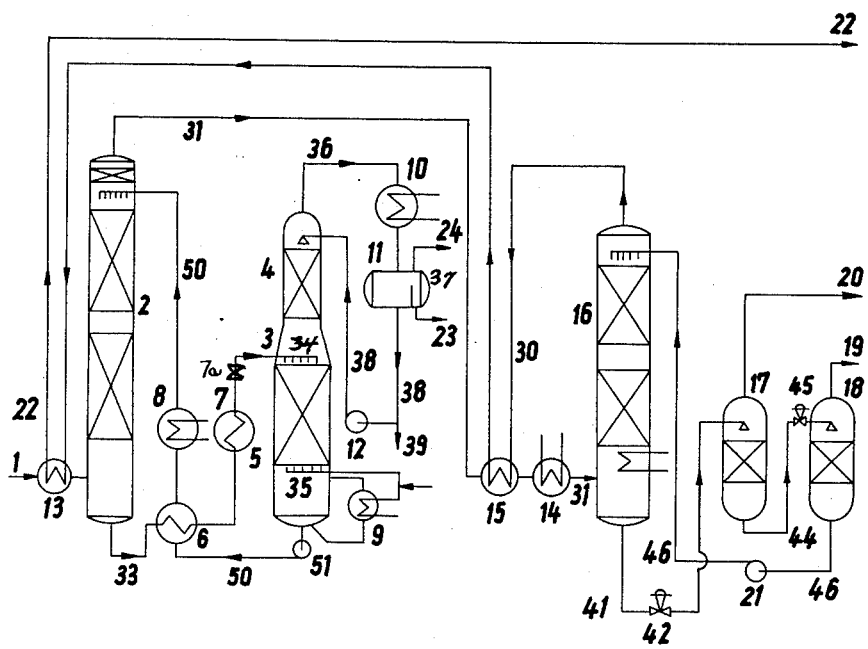
Inventor:
KURT THORMANN, WILHELM HERBERT, HANS-ULRICH KOHRT
By Burgess, Dinklage & Sprung
ATTORNEYS

United States Patent Office 3,120,993
Patented Feb. 11, 1964

3,120,993
GAS PURIFICATION PROCESS
Kurt Thormann and Wilhelm Herbert, Frankfurt am Main, and Hans-Ulrich Kohrt, Bad Homburg vor der Hohe, Germany, assignors to Metallgesellschaft Aktiengesellschaft, Frankfurt am Main, Germany, a corporation of Germany
Filed May 9, 1961, Ser. No. 108,837
Claims priority, application Germany May 11, 1960
11 Claims. (Cl. 23—2)

The invention is a process for purifying gases, and especially for removing sulfur compounds from industrial gases. More particularly the invention relates to a practical and economical process for the removal and recovery of sulfur-containing and acidic components from industrial gases.

Practically all industrial combustible gases, such as coke oven gas, water gas, carburetted water gas, coal gas, refinery waste gas, natural gas contain impurities such as hydrogen sulfide, carbon dioxide, cyanogen, as well as low hydrocarbons, sulfur compounds, etc., which must be removed before the gases are suitable for certain uses. Organic and inorganic sulfur compounds are commonly present in all such gases and most gas purification systems are designed for the removal of these impurities, because they have a corroding effect and/or act as catalyst poisons.

The known processes for the absorption of the acidic components from gas mixtures generally consists of scrubbing out of the gases with alkaline reacting liquids, such as aqueous solutions of inorganic bases or alkali salts of weak inorganic or organic acids. The disadvantages of the known process are that in order to effect a complete removal of hydrogen sulfide from the gas to be purified, the absorbent liquid loaded with absorbed impurities must be entirely regenerated with high expenditure of steam which is mostly prohibitive for reasons of economy and, further, when using an alkaline absorbent solution, for removal of hydrogen sulfide, there is simultaneously absorbed large quantities of carbon dioxide. This is very detrimental for several reasons, for one, the further working up of the hydrogen sulfide into non-volatile sulfur compounds which is necessary to avoid a pollution of atmosphere is interfered with and, further, when the hydrogen sulfide containing gas stripped from the absorbent is to be used in the manufacture of chemical compounds. It is necessary, therefore, to separate the carbon dioxide from the hydrogen sulfide before proceeding further. The use of such basic acting solvents is in many cases therefore inefficient due to the limited extent to which regeneration of the solvent can be effected, the great expenditure of thermal energy necessary to effect regeneration and destruction of the equipment due to excessive corrosion attendant on their use.

Processes employing physically acting organic solvents allow, by using sufficiently high absorption towers and maintaining lower adsorption temperatures, for example, in the region of —20 to —70° C., the obtaining of complete absorption of the hydrogen sulfide with low consumption of energy for the regeneration. The organic solvents, which however possess a good capacity for absorbing hydrogen sulfide, dissolve simultaneously however also other gas components which are not acid, as, for example, saturated and unsaturated hydrocarbons.

Processes for purifying industrial gases are known in which all the impurities contained in the gas, such as hydrogen sulfide and sulfur compounds, carbon dioxide, resinforming substances, such as unsaturated hydrocarbons and other hydrocarbons, metal carbonyls and like, are absorbed simultaneously from the industrial gas mixtures by means of a simple organic polar substance as, for example, methanol or acetone at temperatures below —20° C. and under increased pressure. A concentrated mixture of all of the impurities is desorbed during the regeneration of the solvent and further treated in known manner.

Conditions for carrying out the above process have also been found whereby the organic solvents of the aforesaid type have a certain selectivity for hydrogen sulfide in preference to all of the other gas impurities. Thus, as compared with methanol, acetone has a marked selectivity for hydrogen sulfide. However, during the regeneration, it forms with the latter, compounds which can only be separated from the acetone with difficulty and as a result pass finally into the stripped gas as impurities. When using, as absorbents, aromatic hydrocarbons in the low-temperature washing processes, it is necessary to first dry the gas as the aromatic hydrocarbons are not miscible with water. A comparatively high selectivity was found in the case of the use of dimethyl formamide as absorbent. In the continuous operation of a technical plant, however, the dimethyl formamide undergoes hydrolysis which results in continuous losses and, furthermore, gives rise to the formation of free formic acid which has a corrosive effect on the equipment and necessitates the use of high-grade steel.

The primary object of the invention is to provide a process for purifying industrial gases whereby economy of operation is obtained.

Another object of the invention is to provide a process for purifying industrial gases permitting separation and recovery of hydrogen sulfide without its being contaminated with gas impurities e.g. hydrocarbons, solvents, etc.

Still another object of the invention is to provide a process for purifying industrial gases whereby there is obtained a gas which is an important source of synthesis gas, i.e., a high purity carbon dioxide gas from waste gases.

Other and further objects and advantages of the invention will become more apparent from a consideration of the following description:

The present invention consists in a process for removing impurities from gases which comprises scrubbing the gas with an organic water-soluble absorbent constituting a heterocyclic compound containing in addition to a carbonyl group, a vicinal alkylated tertiary nitrogen atom.

In general, the substances applicable as absorbents for carrying out the gas scrubbing process according to the invention and which are selective for sulfur compounds are N-alkylated lactams of the γ or δ amino acids derivable from butyric acid, valeric acid and caproic acid, namely, the N-alkylated pyrrolidones or piperidones which may be substituted with one or two lower alkyl groups, e.g. methyl groups, on the heterocyclic nucleus.

In the method of the invention which provides an economically executed and highly efficient process for the selective absorption of sulfur compounds from industrial gases which also contain carbon dioxide and hydrocarbons as well as other gas components, the N-alkylated pyrrolidones or piperidones are passed in circulation through the absorption under elevated pressure and the regeneration stages under atmospheric pressure.

While the ratio of the absorption coefficients according to Bunsen, as expressed in liters of absorbed gas per liter of absorbent at a pressure of 1 atm. and at a temperature of 20° C. for hydrogen sulfide and carbon dioxide are in the case of acetone and methanol about equivalent to 5:1, and in the case of dimethyl formamide, about 9:1, the ratio of the coefficients in the case of the lactams in accordance with the invention is about 12:1 to 15:1.

The absorption coefficients for the lower saturated hydrocarbons are considerably lower than those for carbon dioxide.

The absorbents are water-soluble. Their boiling points are between 200 and 250° C.

Absorbents according to the invention are—

N-methyl pyrrolidone boiling point 206°
N-methyl-2-methylpyrrolidone boiling point 215–217°
N-methyl piperidone boiling point 205°

To effect a selective absorption of the hydrogen sulfide and of the organic compounds, a special purifying stage with its own regeneration is necessary, which stage is preferably located as usual at the first point of the gas passage through the whole gas purification procedure. In scrubbing, a gas cooled in the usual manner to ambient temperature and freed from tar under pressure, with an N-alkylated lactam, as absorbent in accordance with the invention, the charged absorbent contains not only the sulfur compounds but also water and the hydrocarbons which are absorbable from or can be condensed out of the gas under the absorption conditions. With an absorption pressure of between 20 and 30 atms. and an absorption temperature of between 5° and 25° C., these are hydrocarbons having a boiling point of about 150° C. In the regeneration of the absorbent according to the invention, the presence of these hydrocarbons must always be taken into consideration even when a special preceding scrubbing stage is provided for them.

The regeneration of the absorbent is effected under atmospheric pressure by heating the absorbent containing impurities and stripping by direct contact with steam in a regenerating tower which consists of a lower stripping zone and an upper concentrating zone. The charged contaminated absorbent is fed into the regenerating tower at about half its height into direct contact with rising countercurrently flowing steam. The regenerated absorbent is removed from the sump of the regenerating tower and fed back through heat exchangers and coolers to the head of the absorption tower. The height of the regenerating tower and the relationship of the heights of the stripping zone and the concentrating zone is so chosen that the reflux at the head of the concentration zone is free from absorbent. Due to the high boiling point of the absorbents, i.e., low volatility, all absorbed gas components are stripped therefrom without any absorbent vapor being carried out with the gas-steam mixture.

The exiting gas-steam mixture is cooled in a condenser and separated into liquid and gaseous portions. The liquid portion is further separated into an upper hydrocarbon phase and a lower aqueous phase by stratification in a separator. The lower phase, after conducting off a quantity of water corresponding to the quantity of steam introduced into the stripping zone, is recycled to the concentrating zone.

According to the invention, the operation of the regenerating tower is so regulated that the regenerated absorbent leaves the column sump with a water content of 1 to 10%, preferably 2 to 5%, and the water content in the column increases towards the top in such a manner that at the head of the concentrating zone there is no longer any absorbent. In the upper part of the stripping zone and in the concentrating zone the desorption of the absorbed gas components is accompanied by a water-vapor distillation whereby all of the hydrocarbons (light ends) are also expelled overhead.

The absorption of the sulfur compounds by the N-alkylated lactams is due solely to physical solubility. For the very selective absorption of hydrogen sulfide a loose coordinate bond on the tertiary nitrogen atom may be assumed to be probable.

The absorbing capacity of physically acting solvents increases, as is known, with decreasing temperature. In order to obtain high absorption values and consequently also the use of a very much smaller volume of absorbent, the process according to the invention is conducted at absorption temperatures of about 0 to 20° C., for example, between 5 and 15° C. If the other gas impurities, and especially the carbon dioxide, are to be scrubbed out in a subsequent low-temperature washing at about −20 to −50° C. as described in the specification of the U.S.A. Patent 2,863,527 the low temperature of the pure gas is sufficient to maintain the absorption temperature in the process according to the invention, independently of the surrounding temperature.

In the accompanying drawing forming a part of the specification and showing for purposes of examplification a typical method and form of apparatuts in which the invention may be embodied and practised but without limiting the claimed invention specifically to such illustration, the simple figure is a flow diagram of an installation which has as first stage the selective absorption of the sulfur compounds according to the invention and as second stage a methanol low-temperature washing for separating the carbon dioxide.

Referring to the drawing, the first stage comprises a counter-flow absorbing tower 2 and an absorbent regenerating tower 3 composed of a lower stripping zone and an upper concentrating zone. The second stage incorporates a low-temperature washing tower 16 and a regeneration device consisting of two pressure release towers 17, 18.

The gas cooled to the surrounding temperature and freed from tar, flows through a conduit 1 and a heat exchanger 13 into the lower end portion of the scrubbing tower 2. It is first cooled to about +10° C. in heat exchanger 13 by the cold pure gas flowing out of the low-temperature washing tower 16 through conduit 30 and from heat exchanger 15. In accordance with the invention, hydrogen sulfide and organic sulfur compounds as well as hydrocarbons and also water are absorbed by the selective solvents in the washing tower 2, the gas rising in counter-current contact with continuously descending absorbent. The gas thus partially purified flows from the head of the washing tower 2 through conduit 31 and heat exchanger 15 and possibly another cooler 14 to the low-temperature washing tower 16 in which the carbon dioxide is scrubbed out with methanol at a temperature of about −40° C. The cold pure gas is led off from the head of washing tower 16 in conduit 30 through heat exchangers 15, 13 and again heated to the surrounding temperature and fed through the conduit 22 for further use.

The regeneration of the absorbent loaded with absorbed impurities in scrubbing tower 2 is effected in the regenerating tower 3 by pressure release, heating and stripping with steam. The loaded absorbent flows out from scrubbing tower 2 through conduit 33, a heat exchanger 6, a heater 7 and a relief valve 7a into the middle zone of the regenerating tower 3 from which it is passed into a distributing device 34. The lower part 5 of the regenerating tower 3 is operated as a stripping zone. A circulating steam-fed evaporator 9 and a distributor 35 for direct steam are arranged in the sump. The upper part of the regenerating tower 3 is constructed as a concentrating column. The water content of the liquid-steam mixtures is increased in upward direction to such an extent that the head product flowing off through the conduit 36 no longer contains any absorbent. The gas-steam mixture passing out from the regenerating tower through the conduit 36 is precipitated in the condenser 10. The gaseous residue contains the hydrogen sulfide and about 10% of the carbon dioxide contained in the crude gas as well as small quantities of lower hydrocarbons. This gas fraction is collected from the discharge 24 of the following separator. The condensate is composed of water, and the hydrocarbons which separate in upward direction in the separator 11 as a lighter layer are drawn off over a weir 37 through the conduit 23. The portion of the condensate forming the lower aqueous layer is recycled to the head of the column through the conduit 38 by means of a pump 12. The excess water accumulating in the course of the process is conducted off through the branch conduit 39. The regeneration is preferably carried out in such a manner that the regenerated absorbent leaves the sump of the regenerating tower with a water content of about 3 to 5%. It is returned to the head of the washing tower 2 by means of a pump 51 through the conduit 50 via heat exchanger 6 and a cooler 8.

The gas purified from sulphur compounds is further treated for removal of carbon dioxide in the following low-temperature scrubbing stage 16. In this second scrubbing stage the absorption heat is removed by an evaporator 40 of a cooler arranged in the proximity of the washing tower sump. The cold loaded absorbent containing the carbon dioxide passes through the conduit 41 and a relief valve 42 into the first pressure releasing vessel 17 and from this through the conduit 44 and the relief valve 45 to the second releasing vessel 18. The absorbent regenerated and cooled by expansion is returned to the head of the washing tower 16 by means of a pump 21 through the conduit 46. The cold content of the expansion gases flowing off through the conduits 19 and 29 can be utilized by heat exchange at suitable points of the process, for example, in the coolers 8, 14, so that the gases can be used at about the surrounding temperature.

*Example I*

In the plant illustrated in the drawing, 50,000 Nm.$^3$/h. of crude gas are purified under a pressure of 25 atms. The hydrogen sulfide is scrubbed out of the gas to a residue concentration of 2 mg. per Nm.$^3$. This concentration is about the limit that can be proved in technical analysis. About 60 m.$^3$/hr. N-methyl pyrrolidone at +10° C. are used in the washing tower 2 and about 150 m.$^3$/hr. methanol at −40° C. in the washing tower 16.

The composition of the gas in volume percent and the corresponding hourly throughput quantities (Nm.$^3$/hr.) are as follows:

|  | Vol. percent | Nm.$^3$/hr. |
|---|---|---|
| $CO_2$ | 30.0 | 15,000 |
| $H_2S$ | 0.6 | 300 |
| $CH_4$ | 11.0 | 5,500 |
| $C_2$ | 0.6 | 300 |
| $C_3$ | 0.2 | 100 |
| $H_2+CO+N_2$ | 57.6 | 28,800 |
|  | 100.0 | 50,000 |

In the first absorption stage the N-methyl pyrrolidone absorbs in Nm.$^3$/hr. and vol. percent:

|  | Nm.$^3$/hr. | Vol. percent |
|---|---|---|
| $H_2S$ | 300 | 15.0 |
| $CO_2$ | 1,650 | 82.5 |
| $CH_4$ | 28 | 1.4 |
| $C_2$ | 13 | 0.65 |
| $C_3$ | 9 | 0.45 |
|  | 2,000 | 100.00 |

Whereas the crude gas contains hydrogen sulfide and carbon dioxide in a volume ratio of 1:50, this ratio in the expelled gas of the N-methyl pyrrolidone regeneration amounts to 1:5.5. That is an enrichment to almost 10 times the amount. The gas which is obtained from the regeneration is suitable for working up to sulfur or sulfuric acid in a known manner. The steam consumption in the regeneration for removal of the sulfur compounds and distilling off the hydrocarbons and the absorbed water amounts to 5 to 6 t./hr.

The pre-purified gas from the washing tower 2 has the following composition (in vol. percent and Nm.$^3$/hr.):

|  | Vol. percent | Nm.$^3$/hr. |
|---|---|---|
| $CO_2$ | 27.8 | 13,350 |
| $CH_4$ | 11.4 | 5,472 |
| $C_2$ | 0.6 | 287 |
| $C_3$ | 0.2 | 91 |
| $H_2+CO+N_2$ | 60.0 | 28,800 |
|  | 100.0 | 48,000 |

The carbon dioxide is washed out of this gas to a residue concentration of about 2% in the low temperature scrubbing in the tower 16. This carbon dioxide is free from sulfurous admixtures and has the purity required, for example, for urea synthesis.

*Example II*

In the plant illustrated in the drawing, 50,000 Nm.$^3$ per hour of a natural gas ore purified under a pressure of 35 atms. at a temperature of 40° C. by scrubbing with 150 Nm.$^3$ N-methyl-2-methyl-pyrrolidone per hour. The sulfur compounds are scrubbed out of the gas to a residual concentration of 0.3 vol. percent.

The composition of the natural gas entering the scrubbing tower 2 (in volume percent and the throughput quantities per hour (Nm.$^3$/hr.) are as follows:

|  | Vol. percent | Nm.$^3$/hr. |
|---|---|---|
| $H_2S$ | 11.0 | 5,500 |
| $CO_2$ | 27.0 | 13,500 |
| $CH_4$ | 57.0 | 28,500 |
| $N_2$ | 5.0 | 2,500 |

The composition of the purified gas is as follows:

| | Vol. percent |
|---|---|
| $H_2S$ | 0.3 |
| $CO_2$ | 16.8 |
| $CH_4$ | 76.0 |
| $N_2$ | 6.9 |

The volume of the purified gas is 36,500 Nm.$^3$. The content of 16.8 vol. percent carbon dioxide may be scrubbed out in a low temperature washing stage with methanol as described in the foregoing example.

The gas impurities, absorbed in the N-methyl-2-methyl-pyrrolidone are 13,500 Nm.$^3$ and have a composition as follows:

|  | Vol. percent | Nm.$^3$ |
|---|---|---|
| $H_2S$ | 40.0 | 53,786 |
| $CO_2$ | 54.4 | 73,304 |
| $CH_4$ | 5.6 | 7,910 |

The concentration of hydrogensulphide in the gas mixture desorbed from the loaded absorbent may be enriched by a partial pressure release of the absorbent before entering the regeneration tower to a pressure of about 12 atms. The gas mixture, escaping by this partial pressure release contains.

| | Vol. percent |
|---|---|
| $H_2S$ | 0.6 |
| $CO_2$ | 89.4 |
| $CH_4$ | 10.0 | and has a volume of 4,900 Nm.$^3$.

After full pressure release to atmospheric pressure are stripped from the absorbent in the regeneration tower 3 8600 Nm.$^3$ of a gas mixture containing

| | Vol. percent |
|---|---|
| $H_2S$ | 62.2 |
| $CO_2$ | 34.3 |
| $CH_4$ | 3.5 |

Example III 30,000 Nm.³/hr. of a gas, obtained by gasification of a heavy oil with oxygen and steam are purified in a plant illustrated in the drawing by scrubbing with 40 Nm.³/hr. N-methyl α piperidone under a pressure of 31.5 atms. at a temperature of 30° C.

The composition (vol. percent) and the throughput (Nm.³/hr.) of the gas to be purified are as follows:

|  | Vol. percent | Nm.³/hr. |
|---|---|---|
| $CO_2$ | 4.3 | 1,290 |
| $H_2S$ | 0.9 | 270 |
| $CO$ | 46.9 | 14,070 |
| $H_2$ | 46.1 | 13,830 |
| $CH_4$ | 0.4 | 120 |
| $N_2$ | 1.4 | 420 |
|  | 100.0 | 30,000 |

The composition (vol. percent) and the throughoput (Nm.³/hr.) of the purified gas are as follows:

|  | Vol percent | Nm³/hr. |
|---|---|---|
| $H_2S$ | 0.0 | 0 |
| $CO_2$ | 3.6 | 1,070 |
| $CO$ | 48.3 | 14,040 |
| $H_2$ | 47.7 | 13,803 |
| $CH_4$ | 0.4 | 117 |
|  | 100.0 | 29,030 |

The composition (vol. percent) and the output (Nm.³/hr.) from the regeneration tower 3 of the gas impurities stripped out of the loaded absorbent are as follows:

|  | Vol percent | Nm.³hr. |
|---|---|---|
| $HS_2$ | 49.0 | 270 |
| $CO_2$ | 40.0 | 220 |
| $CO$ | 5.5 | 30 |
| $H_2$ | 4.9 | 27 |
| $CH_4$ | 0.6 | 3 |

The design of the installation can be modified or simplified for obtaining other gas qualities. Thus, a water washing under pressure can be employed for washing out the carbon dioxide. The adjustment of temperature for the first stage is then effected by cooling water in the coolers 13 and 8 because no cold surplus is available from the second stage. A scrubbing with heptane or a light washing oil can be introduced before or instead of the carbon dioxide scrubbing treatment for removal of the hydrocarbons from natural gases which contain considerable quantities of gaseous hydrocarbons ($C_3$, $C_4$).

For coke-oven gas, the first washing stage according to the invention can be installed as general gas purification after the conventional ammonia separation.

As can be seen from the foregoing description, the ananlyses of the crude gases and of the gas mixtures absorbed by the N-methyl pyrrolidone show that less than 10% of the $C_2$ and $C_3$ hydrocarbons contained in the crude gas are absorbed, with complete absorption of the hydrogen sulfide. The pyrrolidones and piperidones to be used as absorbents have in addition to selectivity for hydrogen sulfide in preference to carbon dioxide also a selectivity for hydrogen sulfide in preference to $C_3$ hydrocarbons. This is important for the purification of natural gases and refinery gases, because it allows a separation of hydrogen sulfide and propane by means of a physically acting solvent absorbent. This separation presents difficulties in many cases in the low-temperature gas decomposition and in low-temperature gas scrubbing processes, because hydrogen sulfide and propane form an azeotropic mixture. The process according to the invention can therefore be applied with advantage to gases or gas fractions, for example, desorbate fractions of low-temperature washing processes, which contain hydrogen sulfide and propane.

We claim:

1. Process for the separation of hydrogen sulfide from industrial gases which additionally contain carbon dioxide and hydrocarbons, which comprises scrubbing the industrial gases with a liquid organic water-soluble absorbent selected from the group consisting of N-alkylated pyrrolidones and piperidones in an absorption zone to thereby absorb hydrogen sulfide, conducting said absorbent containing the absorbed hydrogen sulfide from said absorption to a de-absorption zone, liberating the absorbed hydrogen sulfide from the absorbent to thereby regenerate the same and recycling the regenerated absorbent to the absorption zone.

2. Process according to claim 1, wherein said liberation of hydrogen sulfide is effected by flowing the absorbent containing the dissolved hydrogen sulfide in direct countercurrent contact with steam in the lower stripping part of the regeneration zone, the stripped gases and vapors being rectified in the upper concentration part of said regeneration zone.

3. Process according to claim 2, wherein the absorbent regenerated in said desorption has a water content of from 1 to 10%.

4. Process according to claim 3, wherein the absorbent regenerated in said desorption has a water content of from 3 to 6%.

5. Process according to claim 1, wherein said absorbent is N-methyl pyrrolidone.

6. Process according to claim 1, wherein said absorbent is N-methyl 2-methyl pyrrolidone.

7. Process according to claim 1, wherein said absorbent is N-methyl piperidone.

8. Process according to claim 1, wherein said scrubbing is effected at a temperature of from 0 to 15° C.

9. Process according to claim 1, wherein said absorbent prior to admission into said desorption zone is preheated.

10. Process according to claim 1 in which said scrubbing is effected at a temperature of from about 0 to 15° C. and which includes after said scrubbing removing the remaining carbon dioxide from the gas by scrubbing the gas in a second stage with a polar organic solvent at a temperature below −20° C. and under increased pressure.

11. Process for the separation of hydrogen sulfide from industrial gases which comprises scrubbing the industrial gases with a liquid organic water-soluble absorbent selected from the group consisting of N-alkylated pyrrolidones and piperidones in an absorption zone to thereby absorb hydrogen sulfide, conducting said absorbent containing the absorbed hydrogen sulfide from said absorption to a de-absorption zone, liberating the absorbed hydrogen sulfide from the absorbent to thereby regenerate the same and recycling the regenerated absorbent to the absorption zone.

References Cited in the file of this patent

UNITED STATES PATENTS 2,781,862     Fussman              Feb. 19, 1957

FOREIGN PATENTS 702,876     Great Britain           Jan. 27, 1954